Sept. 4, 1928.  
J. F. O'CONNOR  
1,683,398  
FRICTION SHOCK ABSORBING MECHANISM  
Filed April 22, 1927 2 Sheets-Sheet 2
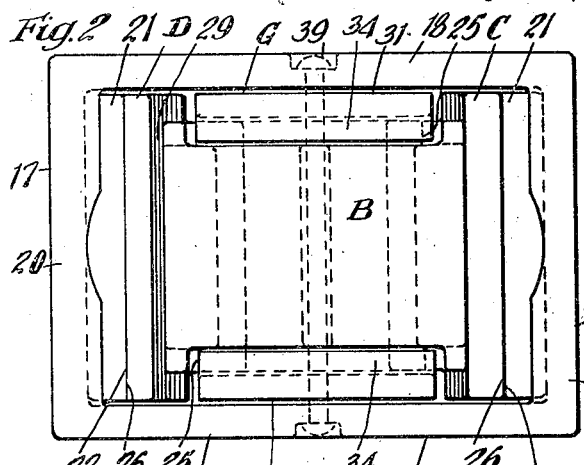
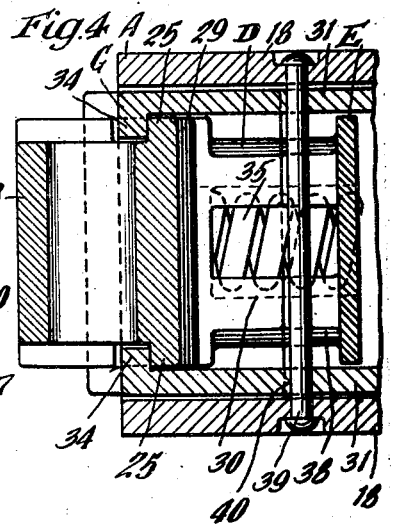
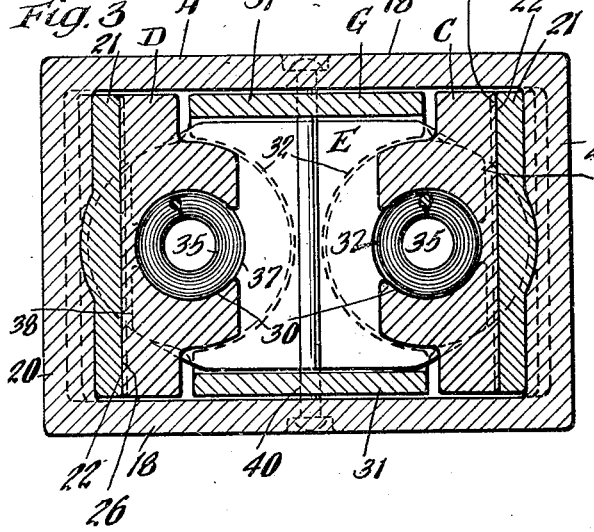
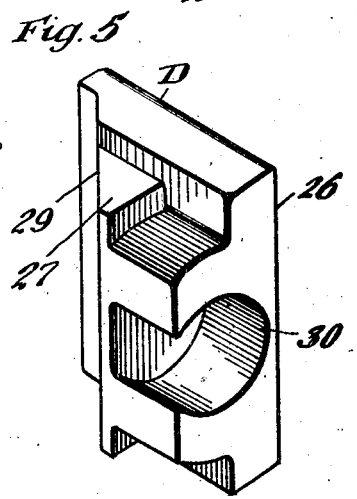
Witness  
Wm. Geiger
Inventor  
John F. O'Connor  
By George D. Haight  
His Atty.

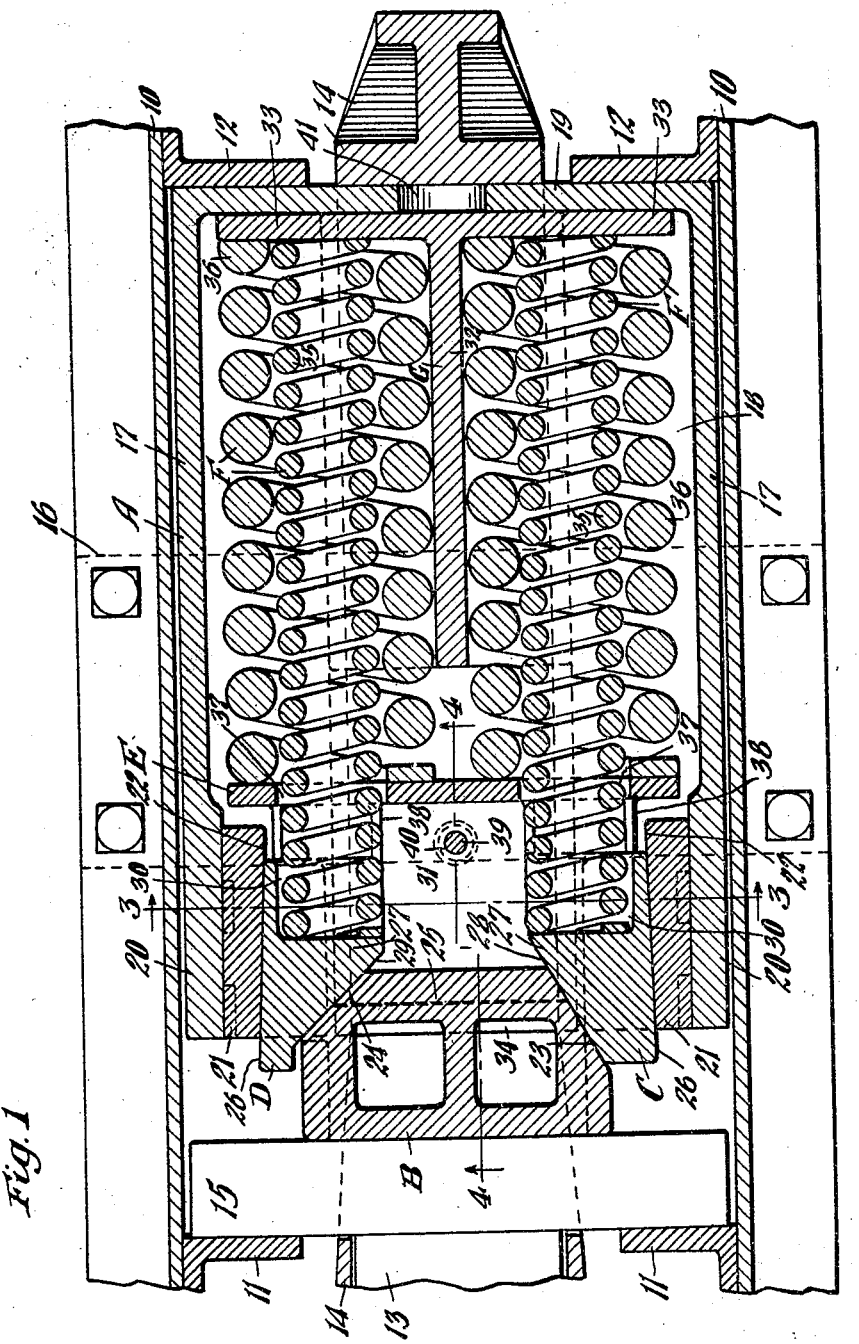

Patented Sept. 4, 1928.

1,683,398

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed April 22, 1927. Serial No. 185,890.

This invention relates to improvements in friction shock absorbing mechanisms.

One object of the invention is to provide a friction shock absorbing mechanism especially adapted for railway draft riggings, including a friction system and a combined pressure transmitting and lateral pressure creating element co-operating with the friction system, wherein simple, efficient and reliable means is provided for maintaining the parts assembled, including a heavy retaining element of rugged design for the combined pressure transmitting and lateral pressure creating element.

Other objects and advantages of the invention will more fully and clearly appear from the description and claims hereinafter following.

In the drawings, forming a part of this specification, Figure 1 is a horizontal, longitudinal sectional view of a portion of a railway draft rigging showing my improvements in connection therewith. Figure 2 is a front end elevational view of the shock absorbing mechanism proper. Figure 3 is a vertical transverse sectional view corresponding substantially to the line 3—3 of Figure 1. Figure 4 is a longitudinal vertical sectional view of the front end of the shock absorbing mechanism proper, corresponding substantially to the line 4—4 of Figure 1. And Figure 5 is a detailed perspective view of one of the friction shoes employed in connection with my improved mechanism.

In said drawings, 10—10 indicate channel-shaped center or draft sills of a railway car underframe, to the inner sides of which are secured the usual front stop lugs 11—11 and rear stop lugs 12—12. The inner end of the drawbar is designated by 13, to which is operatively connected a yoke 14 of well known form. The shock absorbing mechanism proper and a front main follower 15 are disposed within the yoke. The yoke and the parts therewithin are supported in operative position by a detachable saddle plate 16 secured to the draft sills.

The improved shock absorbing mechanism comprises broadly: A combined friction shell and spring cage A; a wedge B; two friction shoes C and D; a spring follower E; a twin spring resistance F; and a retaining element G.

The combined friction shell and spring cage A comprises a substantially rectangular box-like casting having longitudinally disposed spaced side walls 17—17; longitudinally disposed spaced top and bottom walls 18—18 and a transverse rear end wall 19. The rear end wall 19 co-operates with the stop lugs 12 in the manner of the usual rear follower. At the forward end of the spring cage, the side walls 17 are thickened as indicated at 20 and have liners 21—21 anchored thereto. The liners and side walls sections 20 have interengaging ribs and recesses to prevent longitudinal movement of the liners with respect to the cage A. The liners 21 are provided with longitudinally disposed inner friction surfaces 22 which converge inwardly of the mechanism.

The wedge block B is in the form of a cored casting having a transverse flat front end face bearing directly on the inner side of the main follower 15. At the inner end of the wedge block B is provided with a pair of inwardly converging wedge faces 23 and 24 at the opposite sides thereof, the wedge face 23 being disposed at a relatively keen wedge acting angle with respect to the longitudinal axis of the mechanism and the wedge face 24 being disposed at a relatively blunt releasing angle with respect to said axis. At the inner end, the wedge block B is also provided with top and bottom transverse ribs 25—25 for a purpose hereinafter described.

The friction shoes C and D, which are interposed between the wedge B and the liners 21 are of similar design except as hereinafter pointed out. Each of the friction shoes is provided with an outer longitudinally disposed friction surface 26 adapted to co-operate with the friction surface 22 of the corresponding liner. On the inner side, each shoe is laterally enlarged as indicated at 27. The enlargement 27 of each shoe is provided with a front wedge face adapted to co-operate with the wedge face at the corresponding side of the wedge block B, the wedge face of the shoe C being designated by 28 and co-operating with the wedge face 23 of the wedge block B and correspondingly inclined thereto, and the wedge face of the shoe D being designated by 29 and co-operating with the wedge face 24 of the wedge block and correspondingly inclined thereto. At the inner ends, the shoes are provided with openings 30 adapted to form seats for the front ends of the inner coils of the twin arranged main spring resistance means F.

The retaining element G comprises top and bottom plate-like sections 31—31 connected by a central vertically disposed partition wall 32 and the transverse rear end wall 33. The end wall 33, as clearly shown in Figures 1 and 3, is formed integral with the top and bottom plate sections 31 and the partition wall 32 and presents transversely disposed flange-like members which function as rear abutments for the twin arranged spring resistance F and also form a bearing for the rear end of the retaining element G on the end wall 19 of the spring cage. As most clearly shown in Figure 1, the front end section of the partition wall 32 is cut away so as to provide clearance for the spring follower E, the wall being cut away a sufficient distance to accommodate inward movement of the spring follower for the permissible compression stroke of the mechanism. At the forward end, the top and bottom plate-like sections 31 of the retaining element G are provided with laterally projecting flanges 34—34 extending transversely of the mechanism and adapted to engage in front of the ribs 25 of the wedge block B. As will be evident, the flanges 34 serve to anchor the wedge block to the retaining element and provide for a lost motion connection therebetween to permit inward movement of the wedge block during the compression stroke of the mechanism and yet limit the outward movement of the same.

The spring resistance F comprises twin arranged members disposed on opposite sides of the partition wall 32 of the retaining element G, each member including an inner relatively light coil 35 and an outer relatively heavy coil 36. The outer coil 36 of each twin arranged spring resistance member has the rear end thereof bearing directly on the flange-like section 33 of the retaining element G and the front end bearing on the spring follower E. The inner coil 35 of each twin arranged spring resistance member has the rear end thereof also bearing on the flange member 33 of the retaining element G and has the front end thereof bearing on the inner end of the enlargement of the corresponding friction shoe, said end being seated within the opening 30 of the shoe.

The spring follower E which is in the form of a plate-like member, is provided with a pair of openings 37 at the opposite sides thereof which freely accommodate the front ends of the springs 35. At the front, the spring follower E is provided with a pair of hollow bosses 38 at the opposite sides thereof forming walls surrounding the openings 37 and having their front ends bearing on the inner ends of the friction shoes respectively.

When the mechanism is assembled, the spring resistance F is preferably placed under initial compression, thereby urging the spring follower and shoes outwardly and compensating for wear of the various friction and wedge faces and holding the ribs of the wedge engaged with the flanges of the retaining element G. Due to the friction existing between the shoes and the liners, outward movement of the retaining element G will be opposed. However, to insure the parts being held assembled during shipment and handling of the mechanism, I preferably employ a pin or rivet member 39 extending through the aligned openings in the top and bottom wall of the cage A and engaging within aligned openings 40 in the top and bottom plate-like sections of the retaining element G.

In assembling the mechanism, the retaining element G, together with the twin arranged springs, spring follower, friction shoes and liners are placed within the cage A. With the mechanism thus far assembled, the retaining element G is forced outwardly of the spring cage by means of a bar or like member, the end wall 19 of the cage being provided with a central opening 41 to permit engagement of the rear end of the retaining element G by said bar. The assembled parts are thus forced outwardly as a unit until the flanges 34 of the retaining element G are positioned a sufficient distance beyond the front end of the spring cage to permit assembling of the wedge with the retaining element in a lateral direction so that the ribs 25 of the wedge member engage behind the flanges 34 of the retaining element, the friction shoes being forced inwardly against the tension of the main spring resistance to permit this. After the wedge has been thus assembled with the retaining element, the spring resistance F is permitted to expand so as to bring the shoes into engagement with the wedge and hold the ribs 25 of the wedge engaged with the flanges 34 of the retaining element G. The assembled parts are then forced inwardly of the spring cage until the transverse flange sections 33 of the retaining element abut the end wall 19 of the cage. In case the retaining pin or rivet 39 is employed, the same is then inserted through the aligned openings in the top and bottom walls of the cage and in the top and bottom plate-like members 31 of the retaining element, thereby positively preventing outward displacement of the retaining element G.

The operation of my improved shock absorbing mechanism, assuming a compression stroke, is as follows: The front follower 15 and the spring cage A will be moved relatively toward each other, thereby forcing the wedge block B inwardly of the cage A and forcing the shoes inwardly along the friction surfaces of the liners 21 at the same time spreading the shoes apart. This action will continue either until the actuating force is reduced or the front end of the cage A is engaged by the follower 15 whereupon the pressure will be transmitted directly through the cage A, the latter acting as a solid column load transmitting member, thereby preventing the spring resistance F from being unduly compressed. Upon release, when the actuating force is reduced, the expansive action of the main springs will restore all of the parts to normal position.

Compensation for wear of the various friction and wedge faces is had by the expansive action of the spring resistance F which, as hereinbefore stated is under initial compression, thereby urging the friction shoes outwardly and holding the same in contact with the wedge faces of the wedge block and the friction surfaces of the liners.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a combined spring cage and friction shell having opposed side walls provided with interior friction surfaces; of a pair of friction shoes engaging the shell friction surfaces; a block having wedging engagement with the shoes and limiting outward movement thereof; anchoring means for the wedge block having abutment means at the inner end thereof; twin arranged spring resistance elements interposed between the shoes and said abutment means, said spring resistance elements being under initial compression and having the inner end supported entirely by said abutment means; and a lost motion connection between said wedge block and anchoring means, including inter-engaging transverse ribs on the wedge block and anchoring means.

2. In a friction shock absorbing mechanism, the combination with a combined spring cage and friction shell having opposed interior friction surfaces at one end thereof; of friction shoes engaging the shell friction surfaces; a wedge block interposed between the shoes; a member for anchoring the wedge block, said member and block having inter-engaging means providing a lost motion connection and said anchoring member having a transverse abutment member at the inner end thereof adapted to bear on the end wall of the cage; and spring resistance means interposed between the friction shoes and said abutment member, whereby the anchoring member, friction shoes and spring resistance may be moved bodily outwardly of the cage to permit engagement of the wedge with the anchoring member.

3. In a friction shock absorbing mechanism, the combination with a rectangular combined spring cage and friction shell having the side walls thereof provided with longitudinally disposed friction surfaces; of a pair of friction shoes co-operating with the friction surfaces; a wedge interposed between said shoes, said wedge having transverse top and bottom ribs adjacent the inner end thereof; a partition wall member within the cage bearing on the end wall thereof and having abutment means at the inner end and also having forwardly extending arms provided with transverse flanges engaging with the ribs of the wedge to provide a lost motion connection therebetween and limit outward movement of the wedge; twin arranged spring resistance members disposed within the cage, said members being separated by said partition wall member and being interposed between the friction shoes and the abutment means of said partition wall member.

In witness that I claim the foregoing I have hereunto subscribed my name this 18th day of April 1927.

JOHN F. O'CONNOR.